United States Patent [19]

Pasquariello

[11] Patent Number: 5,687,377
[45] Date of Patent: Nov. 11, 1997

[54] METHOD FOR STORING VARIABLES IN A PROGRAMMING LANGUAGE

[75] Inventor: Greg Pasquariello, Littleton, Colo.

[73] Assignee: Electronic Data Systems Corporation, Plano, Tex.

[21] Appl. No.: 539,514

[22] Filed: Oct. 6, 1995

[51] Int. Cl.[6] .............................. G06F 9/14; G06F 9/15
[52] U.S. Cl. .................................................. 395/705
[58] Field of Search ................................ 395/705, 410, 395/708

[56]     References Cited

U.S. PATENT DOCUMENTS

| | | | |
|---|---|---|---|
| 3,624,616 | 11/1971 | Patel | 340/172.5 |
| 5,359,724 | 10/1994 | Earle | 395/425 |
| 5,586,325 | 12/1996 | MacDonald et al. | 395/706 |

OTHER PUBLICATIONS

"Standards in Progress: ANSI's New Fortran 90 Language Standard Offers a Host of Improvements Over 77", Andy Feibus, Open Systems Today, Mar. 1994, p. 31.

*Primary Examiner*—Kevin A. Kriess
*Assistant Examiner*—Kakali Chaki
*Attorney, Agent, or Firm*—L. Joy Griebenow

[57]    ABSTRACT

A system for storing array variables in a programming language, wherein all subscripts are converted to strings, and stored along with the name of the array, allowing strings to be used as subscripts. When the array subscript is another variable, the contents of the subscript variable are converted to a string which is stored along with the array name. Memory is allocated when data is stored in the variable, allowing sparse arrays. A record from a file can be stored with each field of the record stored as an element of an array, indexed by the field name. The type of the data stored in a variable is stored with the data, thus the type can be changed dynamically, and each array element can have a different data type. The size of each dimension of the array can be changed dynamically, and the number of dimensions can be increased dynamically.

19 Claims, 5 Drawing Sheets

METHOD FOR STORING VARIABLES IN A PROGRAMMING LANGUAGE

FIELD OF THE INVENTION

This invention relates to computer systems and more particularly to programming languages within such computer systems. Even more particularly, the invention relates to a method for storing array variables within a programming language that allows the arrays to be re-dimensioned at any time and allows the data type of the array to be changed at any time.

BACKGROUND OF THE INVENTION

Traditional programming languages like C and C++ have implemented array capabilities within the language. An array is defined as a programming language construct used to define a set of ordered data items. While some languages allow dynamic array creation, most require declaration and dimensioning, for example float Array[10][100], and none allow a non-numeric index. The numeric index is traditionally defined as an offset from the beginning of the array's memory location. When accessing an array variable, the index of the array variable is multiplied by the size of the data type of the array and the result is added to the address of the beginning of the array, to determine the physical location of the array variable, and retrieve the actual data value at the array variable location.

These requirements place several limitations on the programmer using the language:

1) The entire array must be of the type declared, "float" in the above example, and it cannot be changed.
2) Space for each element must be reserved in concurrent memory before data can be stored in the array.
3) The array is limited to the number of dimensions specified in the declaration.
4) The upper boundaries for the indices are specified in the array declaration, setting the stage for execution errors such as out of range array errors, walking on memory, programming abends and further maintenance requirements, should any of these boundaries be violated.
5) Reference to the values stored within the array is limited to numeric indexing schemes and is thus limiting.

Some prior art interpretive languages place no type restrictions on variables defined within the language. For example dbase and languages derived from dbase, such as FoxPro and Clipper, have variables that change their type when new data of a different type is stored in the variable. For arrays, however, these languages require that the array size be established before use of the array, through a dimension statement or its equivalent. Also, these languages do not allow non-numeric indices within arrays.

It is thus apparent that there is a need in the art for an improved method or apparatus which allows a user to dynamically create and change arrays within a programming language. The present invention meets these and other needs in the art.

SUMMARY OF THE INVENTION

It is an aspect of the invention to dynamically create both variables and arrays, with no requirements for declaration or dimensioning of variables or arrays.

Another aspect is to allocate memory as needed to store data in variables, but to not preallocate memory before data is stored in a variable. This allows variables to be dynamic, so they can expand or contract as necessary.

A further aspect of the invention is to allow indices to be numeric, string or any other variable type, or combinations of these types.

A still further aspect is to allow arrays to be of mixed data types.

Yet another aspect of the invention is to store fields of a record using field names as an index to the data in the fields.

The above and other aspects of the invention are accomplished in a system that converts all subscripts of array variables to strings, and stores these strings along with the base name of the array. Thus, array elements and non-array variables are stored in the same manner. If the array subscript is another variable, the contents of the subscript variable are obtained and converted to a string which is then stored along with the base name. In addition, no memory is allocated for a variable until data is stored in the variable, thus arrays are normally stored as sparse arrays.

Since the subscripts for arrays are stored as strings, strings may be used as subscripts. This permits data from a file record to be read, and each field of the record stored as an element of an array, indexed by the field name.

The type of the data stored in a variable is stored with the data of the variable. This allows the type of the data to be changed each time new data is stored into a variable. Also, arrays can have different types of data in each element.

As well as dynamically changing the type of the data stored in each array element, storing the array subscripts along with the base name of the array allows the size of each dimension of the array to change dynamically. Also, the number of dimensions can be increased dynamically, simply by appending an additional subscript or additional subscripts to the existing subscripts.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

Figure 1:
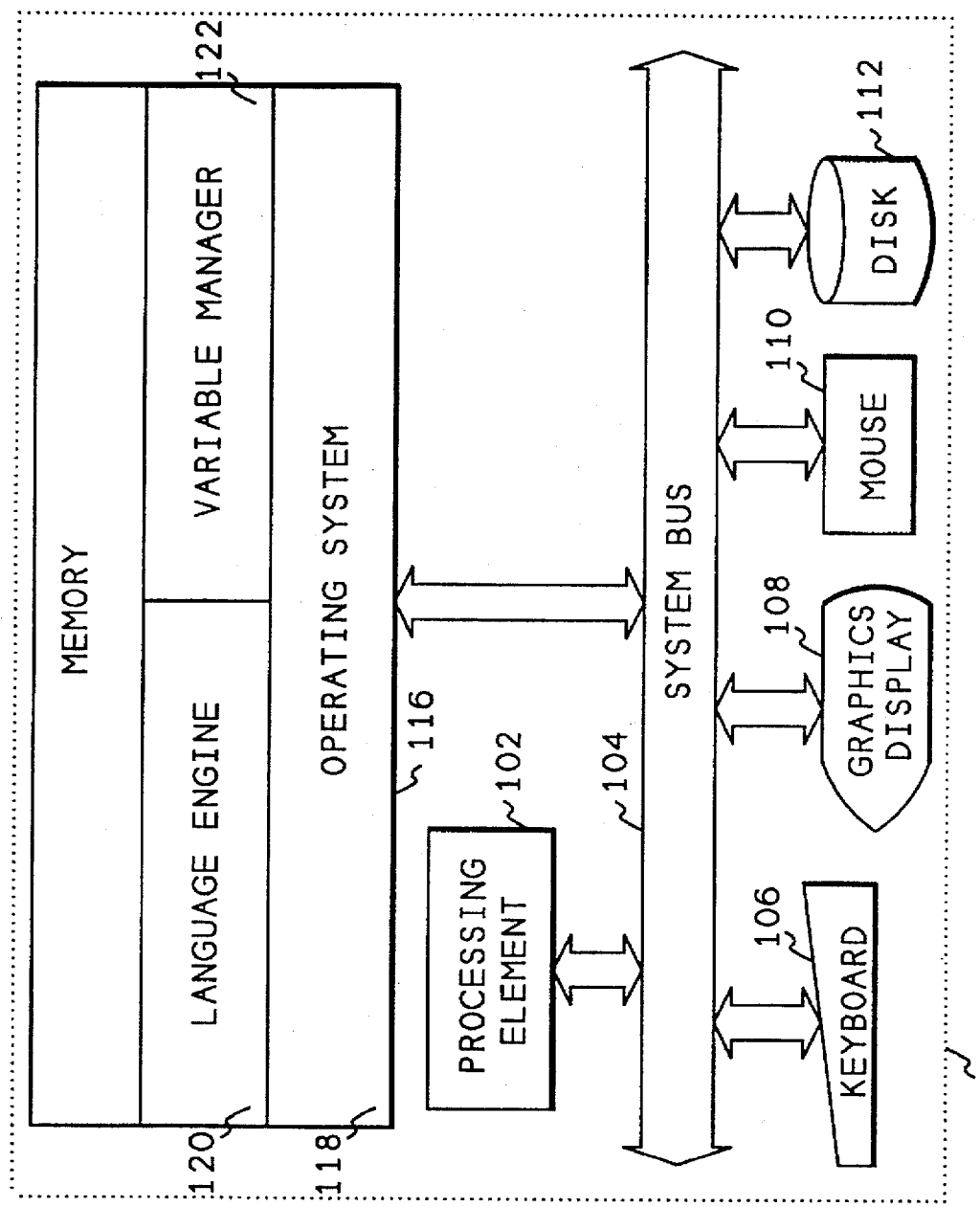
FIG. 1 shows a block diagram of a computer system incorporating the present invention.

The following description is of the best presently contemplated mode of carrying out the present invention. This description is not to be taken in a limiting sense but is made merely for the purpose of describing the general principles of the invention. The scope of the invention should be determined by referencing the appended claims.

The present invention allows dynamic creation of both variables and variable sets, including arrays. There is no requirement for any type of declaration or dimensioning before the variable or variable set is used. The present invention allocates memory on an as needed basis and does not require preallocated memory for variables or variable sets.

For example, assume the following statements were executed in a language:

foo=12;
foo[2] [6]="Fred";
index=8;
foo[index]=5;
foo["RATE"]=4.567;

Essentially these statements indicate that "foo" is an array with dimensions of at least 2×6 and probably has a lower boundary of zero. Some popular languages would have allocated the memory required for the entire two dimensional array. The present invention, however, only allocates the memory required to store each value as it is assigned. So in the above example, enough memory is allocated to store the value 12 and is associated with the variable "foo", enough memory is allocated to store the value "Fred" and is associated with the variable "foo[2] [6]", and so on.

The present invention requires no dimension restrictions on variable sets. Variable sets are dynamic, so they can grow as large as necessary. Since the present invention only allocates the actual memory used, even a large variable set may actually take up less memory than a smaller variable set declared in a traditional language. This eliminates many of the traditional errors caused by arrays exceeding their boundaries, etc.

The variables within the present invention are objects within the language that are either single variables or variable sets. The variables can be one of three data types— string, integer or floating point. The language itself does not allow variables or variable sets to be explicitly typed (that is, they are not declared or dimensioned). The data type of a variable or an element of a variable set is determined by the context of the value assigned to it. The values for the variables are referenced by the variable name and the values for elements of variable sets are referenced by the variable name and some subscript. Subscripts may be numeric, string or another variable.

Single variables contain a single value. The value is assigned through an assignment statement and the variable is referenced by its name. For instance, index=1+4;
ErrorMessage="Unsuccessful attempt to attach database cursor";

The first example causes the variable "index" to be cast as type integer and assigned the value of "5". ErrorMessage in the second example, is cast as a string and assigned the value "Unsuccessful attempt to attach database cursor".

Variable sets contain multiple values. They are similar to arrays and may themselves contain arrays of other variables. The values are assigned via assignment statements or through the execution of file I/O or database access methods. They are referenced via their name and/or by their name and some numeric or string index, or through the use of another variable as an index. Sets can range from 1 to n dimensions (where "n" refers to the mathematical "nth" term). There are no limits to the dimensions allowed. The following is an example of variable sets.

Spam["QUOTE"]="I'm pink, therefore I'm spam!";
index=5;
while (index LT 10) {VarSet[index]=index+4; index=index+ 1;}

The first example shows a simple string subscripted set. Its effect is to assign the "QUOTE" element of the "Spam" variable set the string value of "I'm pink, therefore I am!". The second example shows a set with numeric indexing via another variable. Its effect is to create the "VarSet" one dimensional array containing five elements that are indexed by the value of the variable "index". Each element in "VarSet" is assigned the integer values of "9" through "13" respectively.

Variables are dynamic in nature. Both the variable and data types may change during execution of a program. The variable type, single or set, may change depending on the assignment of single or multiple values. The data type may also change depending on the type of values assigned to it (i.e. string, integer or floating point).

To exemplify the dynamic nature of the variables and the concept of changing the variable types, the following example expands on the previous two examples.

ErrorMessage[1] ["CODE"]=39.297;
ErrorMessage[2] ["CODE"]=58.781;
VarSet[9]="Poof, I'm now a string";

Previously the variable "ErrorMessage" was a single string variable. This example causes it to be changed to a variable set containing a two dimensional floating point array in addition to its previous string value. The element indexed by "9" in the "VarSet" variable now contains the string "Poof, I'm now a string". It previously was an integer data type and contained the value of "13". Note that the original values of both "ErrorMessage" and "VarSet", with the exception of "VarSet[9]", are unchanged and are referencable.

As described above, variable sets may also be created from the execution of file I/O or database access methods. Following is an example that illustrates file I/O operations and the use of field names as index values into a variable set.

A consumer file contains names and addresses of individuals. The format of the file is as follows:

| | |
|---|---|
| first name | length 10 bytes |
| last name | length 15 bytes |
| address | length 20 bytes |
| city | length 25 bytes |
| state | length 2 bytes |
| zip | length 5 bytes |

The scenario would be to iteratively read a record from a file into a variable, for example it could be called "RECORD". After a successful read, the values contained in each of the fields may be accessed by statements that reference the variable name using the file field names as indices. For instance, LastName=RECORD ["last name"]
Zip=RECORD ["zip"]

In the case of database access methods, consider the following execution of a typical SQL statement.

ResultSet=sql(db, "select name, address, age, income from customer where rownum<20");

When this statement is executed it returns up to 20 rows containing four columns (name, address, age, and income). Each of these rows and columns is stored in the "ResultSet" variable set. The data type of "ResultSet" would vary depending on the element selected. In this example, the data types are string, string, integer and floating point, corresponding to the selected columns. The "ResultSet" variable is referenced as follows:

for each row in ResultSet

Name=ResultSet ["NAME"];
Address=ResultSet["ADDRESS"];
Age=ResultSet["AGE"];
Income=ResultSet["INCOME"];

or individual elements within "ResultSet" can be referenced as follows:

Name=ResultSet[0] ["INCOME"];

In this example "ResultSet[0] ["INCOME"]" refers to the first row returned and the "income" column.

FIG. 1 shows a block diagram of a computer system incorporating the present invention. Referring now to FIG. 1, a computer system 100 contains a processing element 102 that communicates with other elements of the computer system 100 over a system bus 104. A keyboard 106 and a mouse device 110 allow input to the computer system 100 while a graphics display 108 allows software within the computer system 100 to output information to a user of the system. A disk 112 stores the data and processes of the present invention.

A memory 116 contains an operating system 118, which is typically the Unix Operating System, although any other operating system will work in a similar manner with the invention. The present invention is incorporated into a language engine 120 and a variable manager 122.

Figure 2:
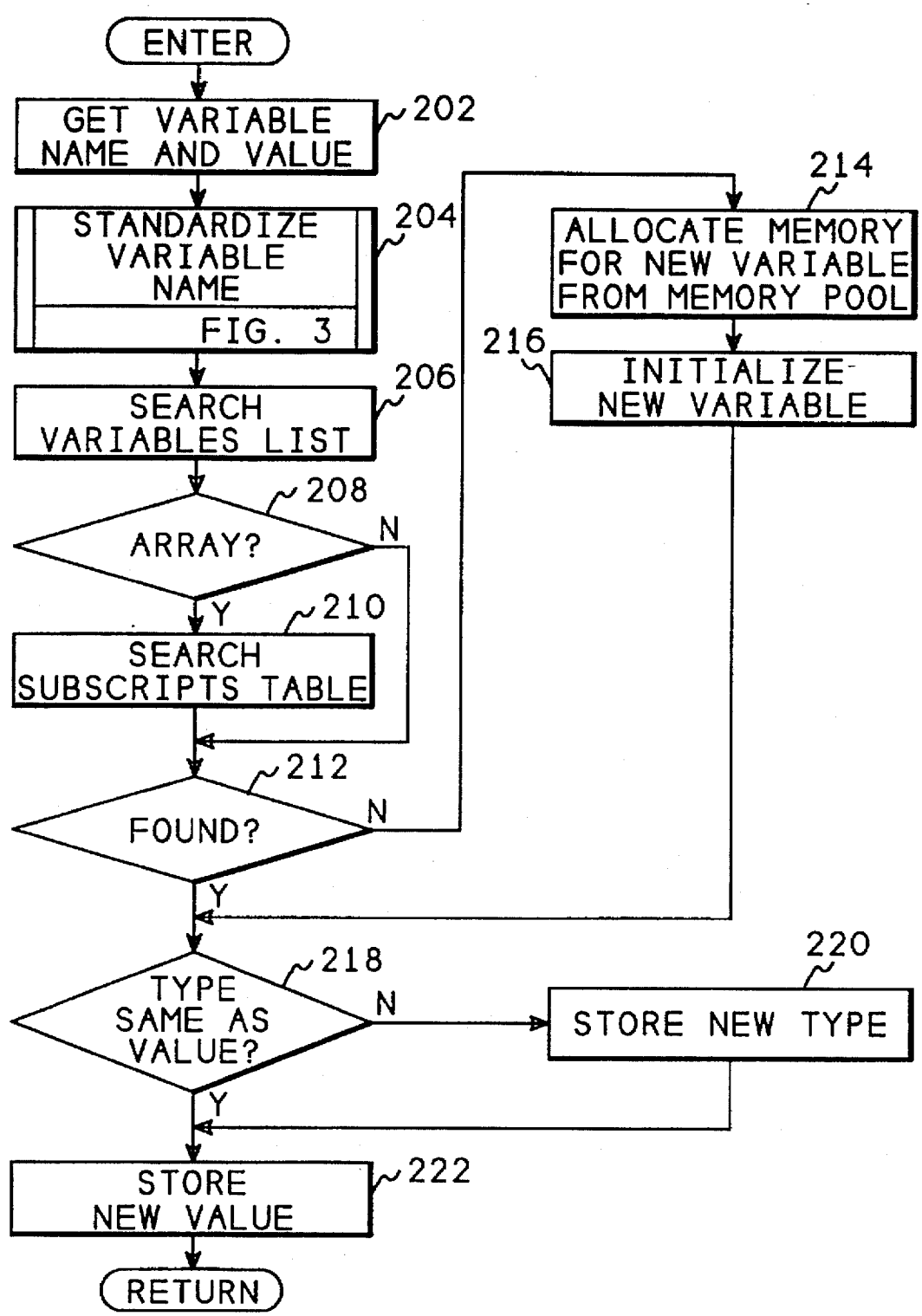
FIG. 2 shows a flowchart of the store data process of the variable manager of the invention.

FIG. 2 shows a flowchart of the store data process within the variable manager 122 (FIG. 1). Since variables do not need to be predefined in the present invention, the process for allocating storage for a variable is part of the process for storing data within that variable. This also means that space for a variable is not allocated until data is stored in the variable, including variable sets and arrays. Thus, an array with little stored data, called a sparse array, uses memory space only for array elements that actually contain data.

Referring to FIG. 2, after entry, block 202 gets the name of the variable and the value to be stored into the variable. Block 204 then calls FIG. 3 to standardize the variable name. Standardization of the variable name involves returning the base name of the variable and converting any subscripts for a variable set or array variable into a string. This differentiates the present invention from other languages, because the present invention stores the index value, as a string, as well as the base name of the variable, if the variable is indexed. These names are stored in two different tables, in the preferred embodiment. The base name of the variable is stored in a variables list, and the subscripts for any indices are stored in a subscripts list for the variable. Those skilled in the art will recognize that the base name and subscripts could be concatenated together and stored in a single variable list.

After standardizing the variable name, block 206 searches the variable list to see if the variable already exists. Block 208 determines if the variable is an array, and if so, goes to block 210 which searches the subscripts list. After searching the two lists, control goes to block 212.

If the variable does not exist, block 212 transfers to block 214 which allocates memory for the new variable from a memory pool and then block 216 initializes data within the new variable. Since, in the preferred embodiment of the present invention, a variable contains information other that the actual data of the variable, for example a flag indicating a data type of the data stored in the variable, this other information must be initialized.

After allocating the new variable, or if the variable already exists, control goes to block 218 which determines whether the type of data previously stored in the variable is the same as the type of the data value to be stored in the variable. If not, block 218 transfers to block 220 which stores a new variable type for the variable. After storing the new variable type, or if the types match, control goes to block 222 which stores the new value into the variable and then returns to the caller.

Figure 3:
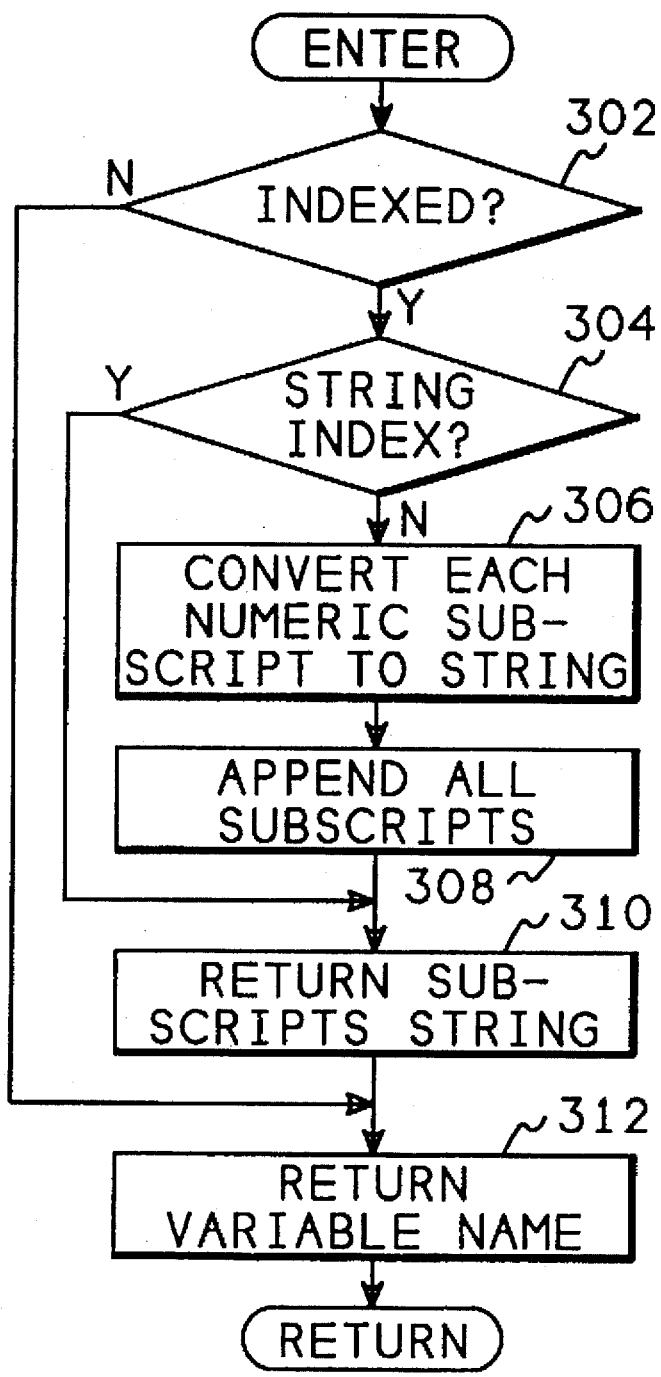
FIG. 3 shows a flowchart of the standardize variable name function called from FIG. 2.

FIG. 3 shows a flowchart of the standardized variable name process called from block 204 of FIG. 2. Referring now to FIG. 3, after entry, block 302 determines whether the variable is an indexed variable, and if not, transfers directly to block 312 which simply returns the variable name. If a variable is not an indexed variable, the standardized variable name is the same as the original variable name.

If the variable is an indexed variable, block 302 transfers to block 304 which determines whether the index for the variable contains a string index or a numeric index. If the variable contains only string indices, block 304 transfers to block 310 which appends each of the index subscripts and then blocks 310 and 312 return the variable name and the subscripts to FIG. 2. Since the index for the variable is already a string then standardization simply consists of appending each the subscripts together.

If one or more of the indices is not a string, block 304 goes to block 306 which converts each numeric subscript to a string and then block 308 appends all the subscripts together. If the subscript is another variable, the value for this subscript variable is obtained, and this value is converted to a string. Block 310 then returns the subscript string to FIG. 2, and block 312 returns the base variable name to FIG. 2.

Storing the index to an array element as part of the array element name causes array elements to be stored in the same manner as non-array variables. That is, the only difference between an array element variable and a non-array variable is that the array element variable has index data connected to its name. This facilitates the sparse array discussed above, and it also allows the dimensions of an array to be changed dynamically. Thus, to add a new dimension to an array, the system simply appends data representing the additional indices to the data representing the original indices in the subscripts list. This also means that an array originally stored with one index will remain independent of an array, having the same name, that is stored with two indices.

This also allows arrays to contain mixed data types. That is, one element of the array can be of one type, integer for instance, and another member of the array can be of another type, string, for instance. As discussed above, the type of any variable, including array elements, can be changed at any time.

Figure 4:
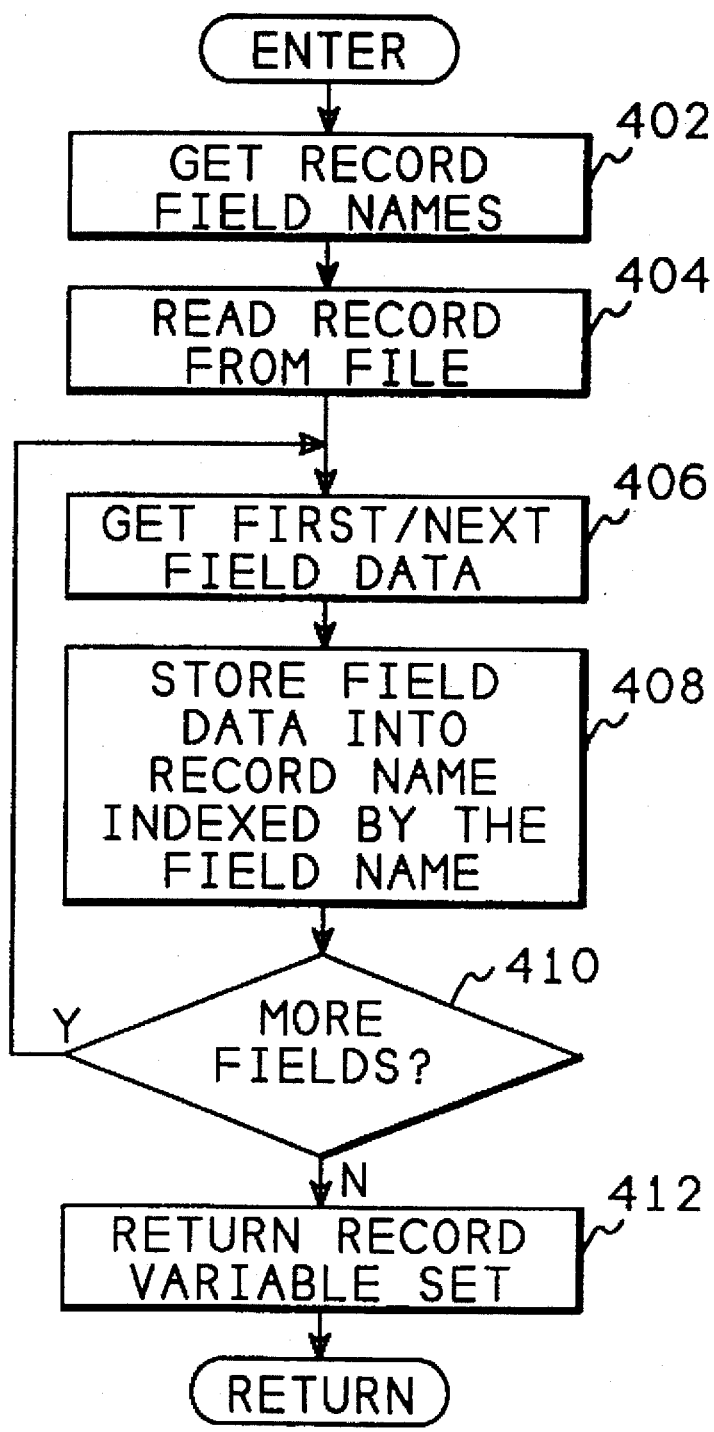
FIG. 4 shows a flowchart of storing file I/O data into a variable set.

FIG. 4 shows a flowchart of the process for reading data from a file and storing the data indexed by the field names in the file. Referring to FIG. 4, after entry, block 402 gets the field names of the fields in the record being read. Block 404 then reads the record data from the file. Block 406 gets the data for the first, or next, field in the record, and block 408 stores this data into a variable set, indexed by the field name. Block 410 determines if additional fields need to be processed, and if so, returns to block 406 to get the next field. After all fields of the record have been processed, block 412 returns the variable set to the caller.

Figure 5:
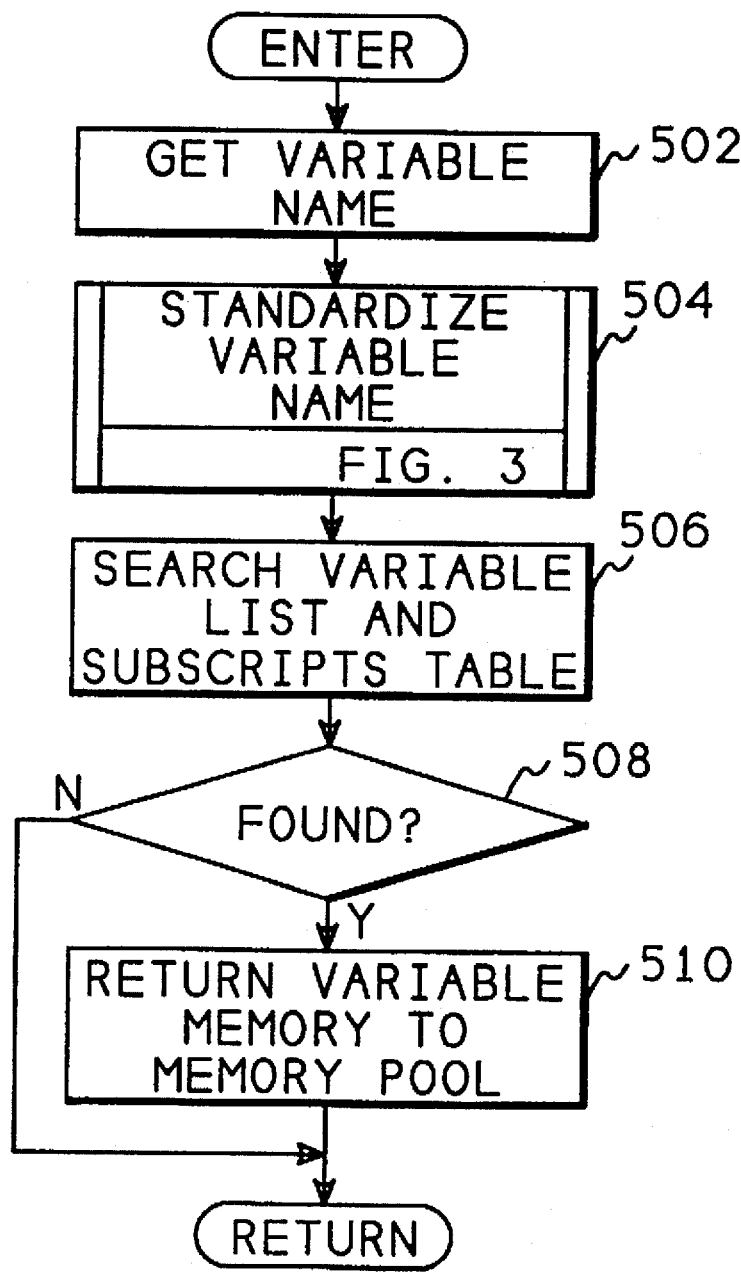
FIG. 5 shows a flowchart of a delete variable process of the variable manager of the invention.

FIG. 5 shows a flowchart of the delete variable process within the variable manager 122 (FIG. 1). This process is called whenever a variable is to be deleted from a program, for example when a variable goes out of scope. Referring now to FIG. 5, after entry, block 502 gets the variable name and block 504 calls FIG. 3 to standardize the variable name. Block 506 then searches the variable list and subscripts table as described in FIG. 2 above, and if the variable is found, block 508 transfers to block 510 which returns the memory used by the variable to the memory pool. After returning the variable to the memory pool, or if the variable did not exist, FIG. 5 returns to its caller.

Having thus described a presently preferred embodiment of the present invention, it will be understood by those skilled in the art that many changes in construction and circuitry and widely differing embodiments and applications of the invention will suggest themselves without departing from the scope of the present invention as defined in the claims. The disclosures and the description herein are intended to be illustrative and are not in any sense limiting of the invention, defined in scope by the following claims.

What is claimed is:

1. A method for storing array variable names and data for the array variable names within a programming language, the method comprising:

(a) separating a base name and a subscript of each variable name;

(b) when the subscript comprises a number, converting the number to a string of characters representing the number;

(c) storing the base name and the subscript in a list of variable names;

(d) allocating a memory area and connecting the base name and the subscript to the memory area; and (e) storing data for the variable in the memory area;

wherein memory is allocated only when data is stored into a variable.

2. The method of claim 1 further comprising the steps of:

(f) when retrieving data for a variable, performing the steps of (f1) separating a base name and a subscript of the variable to be retrieved and placing the base name in a retrieving base name and placing the subscript in a retrieving subscript, (f2) when the subscript comprises a number, converting the number to a string of characters representing the number, and (f3) comparing the retrieving base name to each base name in the list of variable names and comparing the retrieving subscript to each subscript in the list of variable names and when a match occurs, retrieving the data from the memory area connected to the matching base name and subscript.

3. The method of claim 1 wherein step (b) further comprises the step of:

(b1) when the subscript comprises a second variable, retrieving a value contained within the second variable and converting the value to a string of characters representing the value.

4. The method of claim 1 wherein step (c) further comprises the steps of:

(c1) storing the base name in a list of variable names; and (c2) storing the subscript in a list of subscript names.

5. The method of claim 1 wherein step (e) further comprises the steps of:

(e1) storing additional data within the memory area, wherein the additional data is indicative of a type of data being stored.

6. The method of claim 1 wherein step (c) further comprises the steps of:

(c1) before storing the base name and subscript into the list of variables, searching the list of variables to locate a matching base name and subscript; and (c2) when a matching base name and subscript is found in step (c1), retrieving the memory area connected to the matching base name and subscript and continuing with step (e).

7. The method of claim 6 wherein step (e) further comprises the steps of:

(e1) when a matching base name and subscript is found, comparing the type of data within the additional data of the memory area to the type of data to be stored in the memory area, and when the types are different, replacing the type in the additional data with the type of the data to be stored.

8. The method of claim 1 wherein step (c) further comprises the steps of:

(c1) before storing the base name and subscript into the list of variables, searching the list of variables to locate a matching base name and subscript; and (c2) when a matching base name is found wherein a subscript string stored with the base name matches part of the subscript string being stored, storing the new subscript as a different variable subscript;

wherein additional dimensions are added to an array.

9. A method for storing array variable names and data for the array variable names within a programming language, and for storing data from a record of a file, the method comprising:

(a) storing the record as an array wherein each field of the record is stored as an array element, and using a name of each field of the record as a subscript of the array;

(b) separating a name of the array and the subscript of each element;

(c) storing the array name and each subscript in a list of variable names;

(d) allocating a memory area for each subscript and connecting the array name and each subscript to one of the memory areas; and (e) storing data for each field in the memory area connected to the field name.

10. The method of claim 9 wherein step (e) further comprises the steps of:

(e1) storing additional data within the memory area, wherein the additional data is indicative of a type of data being stored.

11. The method of claim 9 wherein step (c) further comprises the steps of:

(c1) before storing the array name and subscript into the list of variables, searching the list of variables to locate a matching array name and subscript; and (c2) when a matching array name and subscript is found in step (c1), retrieving the memory area connected to the matching array name and subscript and continuing with step (e).

12. The method of claim 11 wherein step (e) further comprises the steps of:

(e1) when a matching array name and subscript is found, comparing the type of data within the additional data of the memory area to the type of data to be stored in the memory area, and when the types are different, replacing the type in the additional data with the type of the data to be stored.

13. A method for storing array variable names and data for the array variable names within a programming language, the method comprising:

(a) separating a base name and a subscript of each variable name;

(b) when the subscript comprises a number, converting the number to a string of characters representing the number;

(c) storing the base name in a list of variable names and storing the subscript in a list of subscripts;

(d) allocating a memory area and connecting the base name and the subscript to the memory area; and (e) storing data for the variable in the memory area.

14. The method of claim 13 further comprising the steps of:

(f) when retrieving data for a variable, performing the steps of (f1) separating a base name and a subscript of the variable to be retrieved and placing the base name in a retrieving base name and placing the subscript in a retrieving subscript, (f2) when the subscript comprises a number, converting the number to a string of characters representing the number, and (f3) comparing the retrieving base name to each base name in the list of variable names and comparing the retrieving subscript to each subscript in the list of variable names and when a match occurs, retrieving the data from the memory area connected to the matching base name and subscript.

15. The method of claim 13 wherein step (b) further comprises the step of:

(b1) when the subscript comprises a second variable, retrieving a value contained within the second variable and converting the value to a string of characters representing the value.

16. The method of claim 13 wherein step (e) further comprises the steps of:

(e1) storing additional data within the memory area, wherein the additional data is indicative of a type of data being stored.

17. The method of claim 13 wherein step (c) further comprises the steps of:

(c1) before storing the base name and subscript into the list of variables, searching the list of variables to locate a matching base name and subscript; and (c2) when a matching base name and subscript is found in step (c1), retrieving the memory area connected to the matching base name and subscript and continuing with step (e).

18. The method of claim 17 wherein step (e) further comprises the steps of:

(e1) when a matching base name and subscript is found, comparing the type of data within the additional data of the memory area to the type of data to be stored in the memory area, and when the types are different, replacing the type in the additional data with the type of the data to be stored.

19. The method of claim 13 wherein step (c) further comprises the steps of:

(c1) before storing the base name and subscript into the list of variables, searching the list of variables to locate a matching base name and subscript; and (c2) when a matching base name is found wherein a subscript string stored with the base name matches part of the subscript string being stored, storing the new subscript as a different variable subscript;

wherein additional dimensions are added to an array.

* * * * *